US010355944B2

(12) United States Patent
Fitzgibbon

(10) Patent No.: US 10,355,944 B2
(45) Date of Patent: Jul. 16, 2019

(54) MINIMALLY INVASIVE MONITORING OF PATH QUALITY

(71) Applicant: Riverbed Technology, Inc., San Francisco, CA (US)

(72) Inventor: John G. Fitzgibbon, San Francisco, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 0 days.

(21) Appl. No.: 15/799,303

(22) Filed: Oct. 31, 2017

(65) Prior Publication Data

US 2018/0123910 A1 May 3, 2018

Related U.S. Application Data

(60) Provisional application No. 62/415,335, filed on Oct. 31, 2016.

(51) Int. Cl.
*H04L 12/26* (2006.01)
*H04L 12/24* (2006.01)
*H04L 29/06* (2006.01)

(52) U.S. Cl.
CPC .......... *H04L 41/5009* (2013.01); *H04L 43/08* (2013.01); *H04L 41/5077* (2013.01); *H04L 43/04* (2013.01); *H04L 43/087* (2013.01); *H04L 43/0835* (2013.01); *H04L 43/0852* (2013.01); *H04L 43/0858* (2013.01); *H04L 43/0864* (2013.01); *H04L 43/0888* (2013.01); *H04L 43/106* (2013.01); *H04L 63/0272* (2013.01); *H04L 63/0428* (2013.01)

(58) Field of Classification Search
CPC . H04L 41/5009; H04L 43/04; H04L 63/0428; H04L 43/106; H04L 43/0835; H04L 12/26; H04L 12/28
See application file for complete search history.

(56) References Cited

U.S. PATENT DOCUMENTS

| | | | |
|---|---|---|---|
| 2002/0027884 A1* | 3/2002 | Halme | H04L 43/00 370/253 |
| 2004/0114634 A1* | 6/2004 | Liu | H04L 63/045 370/521 |
| 2005/0207410 A1* | 9/2005 | Adhikari | H04L 12/4633 370/389 |

(Continued)

*Primary Examiner* — Chi Ho A Lee
*Assistant Examiner* — Andrew Lee
(74) *Attorney, Agent, or Firm* — Park, Vaughan, Fleming & Dowler LLP; Laxman Sahasrabuddhe

(57) ABSTRACT

Systems and techniques are described for performing minimally invasive monitoring of path quality in a network. Specifically, path quality requests and measurements can be piggy-backed on the data traffic that is flowing through a secure connection between two network nodes. For example, path quality requests and measurements can be inserted into the TFC padding field of IP/ESP packets that are being communicated between two IPsec devices. The disclosed embodiments ensure that the number/frequency of measurements increases/decreases naturally in proportion to the amount of traffic flowing, and that the measurement data does not get differential treatment in the network as they are intrinsically bound to the data packets being monitored.

21 Claims, 5 Drawing Sheets

(56) References Cited

U.S. PATENT DOCUMENTS

| | | | | |
|---|---|---|---|---|
| 2007/0002857 A1* | 1/2007 | Maher | ............... | H04L 12/4633 |
| | | | | 370/389 |
| 2008/0267217 A1* | 10/2008 | Colville | ............... | H04L 47/10 |
| | | | | 370/477 |
| 2010/0223458 A1* | 9/2010 | McGrew | ............... | H04L 9/0833 |
| | | | | 713/153 |
| 2013/0061034 A1* | 3/2013 | Walheim, Sr. | ...... | H04L 63/0272 |
| | | | | 713/150 |
| 2013/0103940 A1* | 4/2013 | Badea | ............... | H04L 43/50 |
| | | | | 713/160 |
| 2014/0153572 A1* | 6/2014 | Hampel | ............... | H04L 12/6418 |
| | | | | 370/392 |
| 2014/0169562 A1* | 6/2014 | Billonneau | ......... | H04L 63/0272 |
| | | | | 380/270 |
| 2016/0105401 A1* | 4/2016 | Vemulapalli | ........ | H04L 63/0428 |
| | | | | 713/160 |
| 2016/0212098 A1* | 7/2016 | Roch | ............... | H04L 63/029 |

\* cited by examiner

MINIMALLY INVASIVE MONITORING OF PATH QUALITY

RELATED APPLICATION

This application claims benefit of U.S. Provisional Patent Application No. 62/415,335, filed 31 Oct. 2016, the contents of which are herein incorporated by reference in their entirety for all purposes.

BACKGROUND

The present disclosure relates to data communication networks. More specifically, the present disclosure relates to monitoring path quality in a data communication network. SLAs (Service Level Agreements) on private circuits (provider Multiprotocol Label Switching, for example) often guarantee certain constraints on bandwidth, latency and jitter for particular classes of Internet Protocol (IP) traffic, in addition to more general overall bandwidth and privacy guarantees. For example, an SLA may provide performance guarantees for each Quality of Service (QoS) class.

Many enterprises are interested in replacing/augmenting these expensive private circuits with cheaper Internet uplinks. The "circuit" and "security/privacy" aspects of a private circuit can be mimicked with existing Virtual Private Network (VPN) technologies, such as Internet Protocol security (IPsec). However, Internet uplinks are inherently "best-effort" in terms of performance, so it is difficult, or sometimes even impossible, to provide absolute guarantees with respect to bandwidth, latency, and jitter for particular QoS-classes of traffic.

Intelligent application of inbound/outbound shaping and prioritization at the endpoints of a VPN is often sufficient to mimic the performance characteristics of a private circuit in many scenarios. However, there is still a general need to monitor the behavior of the VPN itself, ideally on a per-QoS-class basis, to ensure that desired performance targets are being met.

In order to take remedial action in the event that an uplink is failing to deliver desired characteristics, the monitoring tool must be highly responsive (i.e., taking frequent measurements) while also minimizing its impact on traffic flow (i e , minimizing the impact that exchanging measurement data has on the bandwidth, latency and jitter of the data being monitored). In addition, since the monitoring data is itself private/sensitive in nature, it must be protected by a level of security no less than that of the data being monitored.

Existing network path quality measurement and monitoring tools can be generally divided into two categories: "active" and "passive."

Unfortunately, the existing tools have multiple drawbacks. Specifically, existing "active" measurement tools (ping, Two-Way Active Measurement Protocol (TWAMP), etc.) tend to scale poorly as network size and load increase. Because they introduce a significant amount of synthetic traffic (measurement probe packets) into the network, when the number of tunnels to probe or the volume of data traffic goes up, it is necessary to scale back the probing frequency to avoid swamping the network with probe data. This has the undesirable property of making the monitoring less responsive exactly when it is most needed: under high load. A secondary problem with such tools that use "synthetic" probing is that the probe packets are not guaranteed to receive the same treatment as the data traffic for which it is desirable to monitor path quality. For example, a small Internet Control Message Protocol (ICMP) ping packet may be queued ahead of larger data packets, resulting in inaccurate estimates of network latency.

Existing "passive" measurement tools (e.g., inline capture, Transport Control Protocol (TCP) Round-Trip Time (RTT), or application analysis) have two flaws. First, these techniques cannot distinguish network delays from application delays. For example, the time spent processing an application request, or waiting for a server resource to become available, would be included in the analysis of "network delay." While this is a valuable measure of the end-user's overall quality of experience, it does not provide sufficient information to allow a self-healing network to determine if an underlying problem is network- or application-oriented. Second, passive analysis, particularly application-specific analysis, can often be CPU and/or memory intensive, and it can be prone to rapid obsolescence as new application protocols emerge or old protocols evolve.

Therefore, what are needed are techniques and systems to monitor network path quality without the above-described drawbacks.

SUMMARY

Some embodiments described herein provide techniques and systems for monitoring of path quality in a data communication network. The embodiments disclosed herein do not suffer from the above-described drawbacks in existing path quality monitoring approaches. Specifically, because embodiments disclosed herein piggy-back path quality measurements on a representative sample of data traffic: (1) the number/frequency of measurements increases/decreases naturally in proportion to the amount of traffic flowing, and (2) the measurement data does not get differential treatment in the network as they are intrinsically bound to the data packets being monitored.

Embodiments disclosed herein can be used with passive monitoring tools, which continue to be valuable for assessing the overall end-user quality of experience. However, the embodiments overlap with a subset of the functionality of passive monitoring tools, but without their shortcomings. Specifically, the embodiments are designed to distinguish between network-related and application-related delays. Therefore, the data is directly relevant and actionable in the context of a self-healing, software-defined networking environment. Moreover, other than the measurement protocol itself, there is no additional application-level analysis required. Also, the amount of state that the measuring agent is required to maintain is minimal. Therefore, the embodiments are suitable for use in environments where CPU and/or memory is constrained.

In some embodiments, a source node can add a path quality record to a Traffic Flow Confidentiality (TFC) padding field of a first Internet Protocol (IP)/Encapsulated Security Payload (ESP) packet. Next, the source node can send the first IP/ESP packet to a destination node. The source node can then receive a second IP/ESP packet from the destination node. Next, the source node can extract a response path quality record from a TFC padding field of the second IP/ESP packet. The source node can then determine a path quality metric based on the response path quality record.

In some embodiments, the path quality record includes a path identifier that corresponds to a network path, a class identifier that corresponds to a Quality of Service (QoS) class, and a sequence number that is used to distinguish between distinct path quality records.

In some embodiments, the path quality metric is an IP/ESP packet throughput value corresponding to the network path and the QoS class. In some embodiments, the path quality metric is an IP/ESP packet loss value corresponding to the network path and the QoS class.

In some embodiments, the path quality record includes (1) a latency measurement request, and (2) a first timestamp when the first IP/ESP packet was sent by the source node.

In some embodiments, the response path quality record includes (1) the first timestamp when the first IP/ESP packet was sent by the source node, (2) a second timestamp when the first IP/ESP packet was received by the destination node, (3) a third timestamp when the second IP/ESP packet was sent by the second computer, and (4) a fourth timestamp when the second IP/ESP packet was received by the source node. In some of these embodiments, the path quality metric can be a round trip delay time value corresponding to the network path and the QoS class. In some of these embodiments, the system clocks of the source node and the destination node can be synchronized, and the path quality metric can be a one-way latency value corresponding to the network path and the QoS class. In some of these embodiments, the path quality metric is a jitter value corresponding to the network path and the QoS class.

In some embodiments, the destination node can receive the first IP/ESP packet from the source node. Next, the destination node can extract the path quality record from the TFC padding field of the first IP/ESP packet. The destination node can then use the path quality record to determine path quality measurement data corresponding to the network path and QoS class. Next, the destination node can create the response path quality record, wherein the response path quality record includes the path quality measurement data. The destination node can then add the response path quality record to the TFC padding field of the second IP/ESP packet. Next, the destination node can send the second IP/ESP packet to the source node.

In some embodiments, the path quality measurement data includes an IP/ESP packet throughput value corresponding to the network path and the QoS class. In some embodiments, the path quality measurement data includes an IP/ESP packet loss value corresponding to the network path and the QoS class. In some embodiments, the path quality measurement data includes (1) a timestamp corresponding to when the first IP/ESP packet was received at the destination node, and (2) a timestamp corresponding to when the second IP/ESP packet was sent to the source node.

DETAILED DESCRIPTION

Figures 1A, 1B:
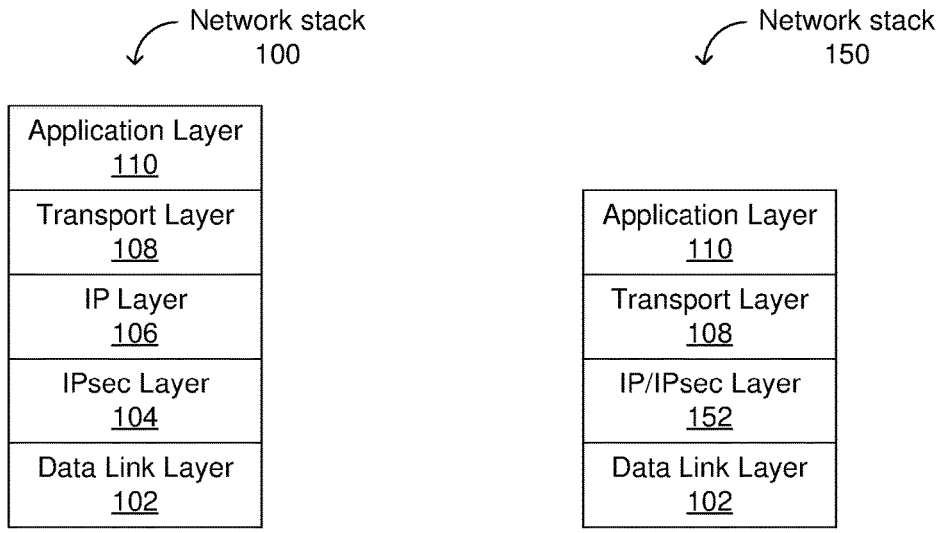
FIGS. 1A and 1B illustrate two examples of how IPsec can be implemented in a network stack in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Communication between two nodes in a network is typically accomplished using a layered software architecture, which is often referred to as a networking software stack or simply a networking stack. As is true of any data processing function, a given functionality in a networking stack can be implemented using hardware or software or a combination thereof. The decision to implement a specific functionality in hardware or software is typically based on a tradeoff between performance and cost.

Each layer is usually associated with one or more protocols which define the rules and conventions for processing packets in that layer. Each lower layer performs a service for the layer immediately above it to help with processing packets, and each layer typically adds a header (control data) that allows peer layers to communicate with one another. At the sender, this process of adding layer-specific headers is usually performed at each layer as the payload moves from higher layers to lower layers. The receiving host generally performs the reverse process by processing headers of each layer as the payload moves from the lowest layer to the highest layer.

A data link layer (or link layer for short) can be defined as a layer that manages a communication channel between adjacent communication devices. For example, if two routers are connected to each other via a cable, then the link layer would typically manage the communication channel between these two routers. The Ethernet layer is an example of a link layer. A network layer can be defined as a layer that enables communication between any two devices across a network of devices. For example, the IP layer is an example of a network layer that enables communication between two routers in an IP network. A transport layer delivers packets between a source and destination, and can retransmit packets if they are lost, and ensure that packets are delivered in a particular order. TCP is an example of a transport layer protocol. The application layer comprises software applications that use the network to communicate with other applications executing at other network nodes. The Hypertext Transfer Protocol (HTTP) is an example of an application layer protocol.

IPsec is a network protocol suite that can authenticate and encrypt data packets sent over a network. IPsec includes protocols for establishing mutual authentication between agents at the beginning of the session and negotiation of cryptographic keys to use during the session. An IPsec device can generally be any device that can communicate with a peer by using the IPsec protocol suite. In particular, an IPsec device can be a security gateway.

FIGS. 1A and 1B illustrate two examples of how IPsec can be implemented in a network stack in accordance with some embodiments described herein. As shown in FIG. 1A, network stack 100 can include data link layer 102, IP layer 106, transport layer 108, and application layer 110. IPsec layer 104 can be inserted between data link layer 102 and IP layer 106. FIG. 1B shows network stack 150 in which the IP/IPsec layer 152 integrates the IPsec functionality into the IP layer. The implementations shown in FIGS. 1A and 1B are for illustration purposes only and are not intended to limit the scope of this disclosure. Some embodiments disclosed herein implement minimally invasive path monitoring by modifying the software code in IPsec layer 104 or in IP/IPsec layer 152.

ESP is a member of the IPsec protocol suite. Specifically, ESP provides origin authenticity, integrity, and confidentiality protection of packets. ESP can be used to create two types of secure connection between two IPsec devices: a transport mode secure connection, and a tunnel mode secure connection. In a transport mode secure connection, only the payload of the IP packet is encrypted and/or authenticated. However, the IP header is neither modified nor encrypted. In a tunnel mode secure connection, the entire IP packet is encrypted and authenticated. Next, the encrypted and authenticated IP packet is encapsulated into a new IP packet with a new IP header. VPNs are created using tunnel mode secure connections.

Figure 2:
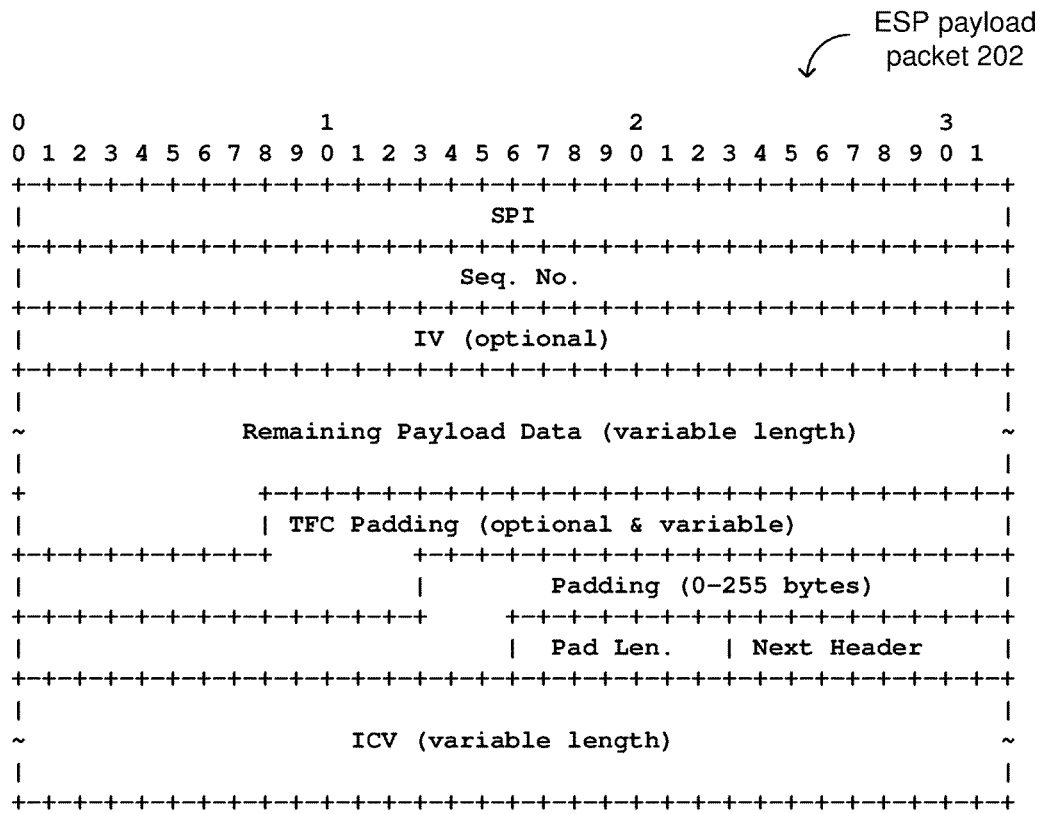
FIG. 2 illustrates an ESP payload packet in accordance with some embodiments described herein.

FIG. 2 illustrates an ESP payload packet in accordance with some embodiments described herein. ESP payload packet 202 includes a plurality of fields. The Security Parameters Index field (labeled "SPI" in FIG. 2) is 32 bits long, and can include an arbitrary value that can be used (together with the destination IP address) to identify the security association of the receiving party. The Sequence Number field (labeled "Seq. No." in FIG. 2) is 32 bits long, and is a monotonically increasing sequence number (incremented by 1 for every packet sent) to protect against replay attacks. A separate counter can be maintained for every security association.

The next three fields in ESP payload packet 202 contain the payload that is being carried by the ESP payload packet. The payload can have three fields. The first field, which is labeled "IV (optional)" in FIG. 2, contains the Initialization Vector (IV) which can include any cryptographic synchronization data that may be required by the encryption algorithm. This is an optional field because its existence depends on the encryption algorithm. The second field, which is labeled "Remaining Payload Data (variable length)" in FIG. 2, contains the original contents of the TCP packet (when ESP is used in transport mode) or the original contents of the IP packet (when ESP is used in tunnel mode). The third field, which is labeled "TFC padding (optional & variable)" in FIG. 2, can contain padding that is intended to protect against statistical traffic analysis attacks by hiding or masquerading the traffic pattern. Some embodiments described herein use the TFC padding field to implement minimally invasive path monitoring.

The next field is labeled "Padding (0-255 bytes)" in FIG. 2, and this field includes padding for the encryption algorithm, i.e., padding to extend the payload data to a size that fits the cipher block size of the encryption algorithm, and that aligns the next field. The field labeled "Pad Len." is 8 bits long, and specifies the length of the padding field (i.e., it specifies the length of the field labeled "Padding (0-255 bytes)"). The field labeled "Next Header" is 8 bits in length, and specifies the type of the next header. The value of this field is taken from the list of IP protocol numbers, and it specifies the type of content that is protected. The field labeled "ICV (variable length)" contains the Integrity Check Value (ICV), whose length is a multiple of 32 bits. This field may also contain padding to align the field to an 8-octet boundary for IPv6, or a 4-octet boundary for IPv4. Further details of the ESP payload packet format can be found in S. Kent, "IP Encapsulating Security Payload (ESP)," Internet Engineering Task Force (IETF) Request for Comments (RFC) 4303, December 2005.

Figure 3:
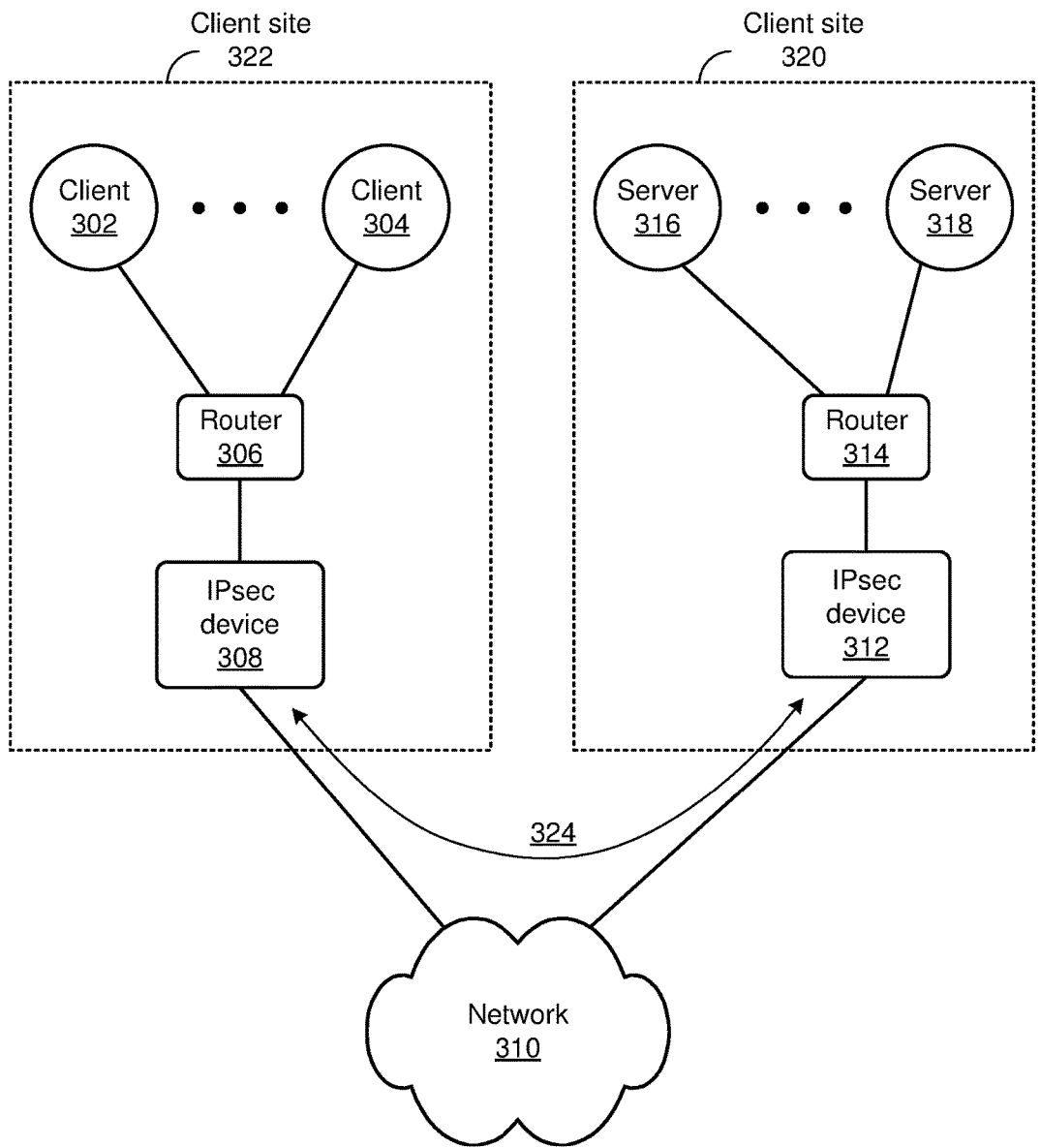
FIG. 3 illustrates a network in accordance with some embodiments described herein.

FIG. 3 illustrates a network in accordance with some embodiments described herein. The number and types of devices shown in FIG. 3 are for illustration purposes only and are not intended to limit the scope of this disclosure. For example, in some embodiments, a client site (e.g., client sites 320 and 322) may include one or more load balancers, one or more switches, one or more caching devices, etc. Although some of the examples described in this disclosure are in the context of a WAN, the disclosed systems and techniques can generally be used to improve performance of any type of network.

In the example illustrated in FIG. 3, client site 322 can be a company's headquarters or a company's regional office. Client site 322 can include one or more clients, e.g., clients 302, 304, etc., router 306, and IPsec device 308. Client site 320 can host servers and data storage systems for the company's enterprise network. Client site 320 can include one or more servers, e.g., servers 316, 318, etc., router 314, and IPsec device 312.

IPsec device 308 can establish secure connection 324 with IPsec device 312, and can use secure connection 324 to securely communicate data between client site 322 and client site 320. Secure connection 324 can be a transport mode secure connection or a tunnel mode secure connection.

Minimally Invasive Monitoring of Path Quality

Figure 4A:
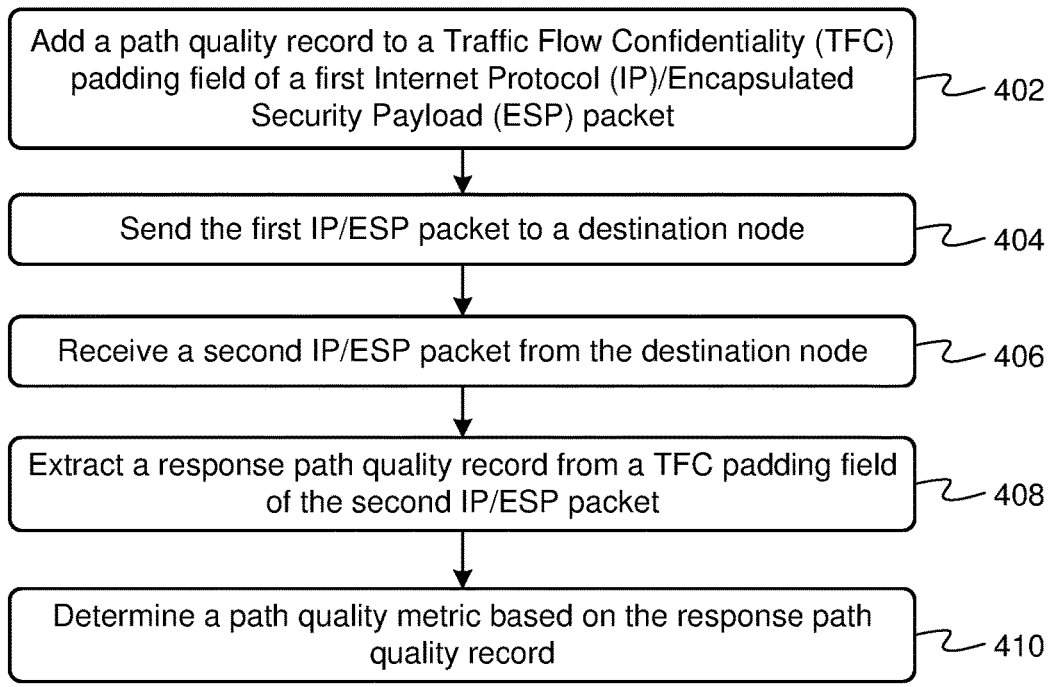
FIGS. 4A and 4B present flowcharts that illustrate processes for minimally invasive monitoring of path quality in accordance with some embodiments described herein.
Figure 4B:
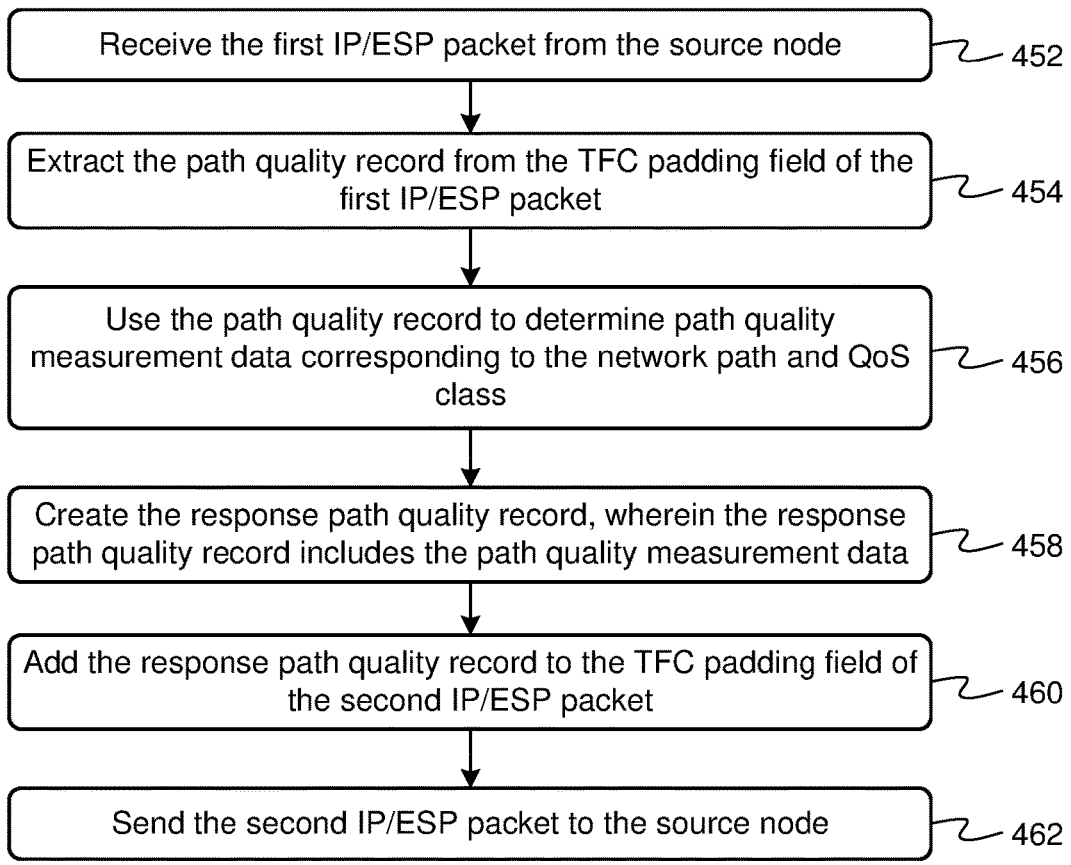

FIGS. 4A and 4B present flowcharts that illustrate processes for minimally invasive monitoring of path quality in accordance with some embodiments described herein. The process in FIG. 4A can be performed at a source node, and the process in FIG. 4B can be performed at a destination node. For example, the source node could correspond to IPsec device 308 and the destination node could correspond to IPsec device 312. Alternatively, the source node could correspond to IPsec device 312 and the destination node could correspond to IPsec device 308.

As shown in FIG. 4A, the process at the source node can begin by adding a path quality record to a TFC padding field of a first IP/ESP packet (step 402). The path quality record can include a path identifier that corresponds to a network path, a class identifier that corresponds to a Quality of Service (QoS) class, and a sequence number that is used to distinguish among distinct path quality records. The path quality record can also include (1) a latency measurement request, and (2) a first timestamp when the first IP/ESP packet was sent by the source node.

Next, the source node can send the first IP/ESP packet to a destination node (step 404). The first IP/ESP packet can be processed at the destination node as described in reference to FIG. 4B. The destination node can, in response to processing the first IP/ESP packet, send a second IP/ESP packet back to the source node. The source node can then receive a second IP/ESP packet from the destination node (step 406). Next, the source node can extract a response path quality record from a TFC padding field of the second IP/ESP packet (step 408).

The source node can then determine a path quality metric based on the response path quality record (step 410). One or more path quality metrics can be determined. For example, the path quality metric can include an IP/ESP packet throughput value corresponding to the network path and the QoS class. The path quality metric can include an IP/ESP packet loss value corresponding to the network path and the QoS class.

If the path quality record included a latency measurement request, then the response path quality record can include (1) the first timestamp when the first IP/ESP packet was sent by the source node, (2) a second timestamp when the first IP/ESP packet was received by the destination node, (3) a third timestamp when the second IP/ESP packet was sent by the second computer, and (4) a fourth timestamp when the second IP/ESP packet was received by the source node. In this case, the path quality metric can include a round trip delay time value corresponding to the network path and the QoS class. If the system clocks of the source node and the destination node are synchronized, then the path quality metric can include a one-way latency value corresponding to the network path and the QoS class. The path quality metric can also include a jitter value corresponding to the network path and the QoS class.

As shown in FIG. 4B, the process at the destination node can begin by receiving the first IP/ESP packet from the source node (step 452). Next, the destination node can extract the path quality record from the TFC padding field of the first IP/ESP packet (step 454). The destination node can then use the path quality record to determine path quality measurement data corresponding to the network path and QoS class (step 456). The path quality measurement data can include one or more of: (1) an IP/ESP packet throughput value corresponding to the network path and the QoS class, and (2) an IP/ESP packet loss value corresponding to the network path and the QoS class. If the path quality record included a latency measurement request, then the path quality measurement data can include (1) a timestamp corresponding to when the first IP/ESP packet was received at the destination node, and (2) a timestamp corresponding to when the second IP/ESP packet was sent to the source node.

Next, the destination node can create the response path quality record, wherein the response path quality record includes the path quality measurement data (step 458). The destination node can then add the response path quality record to the TFC padding field of the second IP/ESP packet (step 460). Next, the destination node can send the second IP/ESP packet to the source node (step 462).

Figure 5:
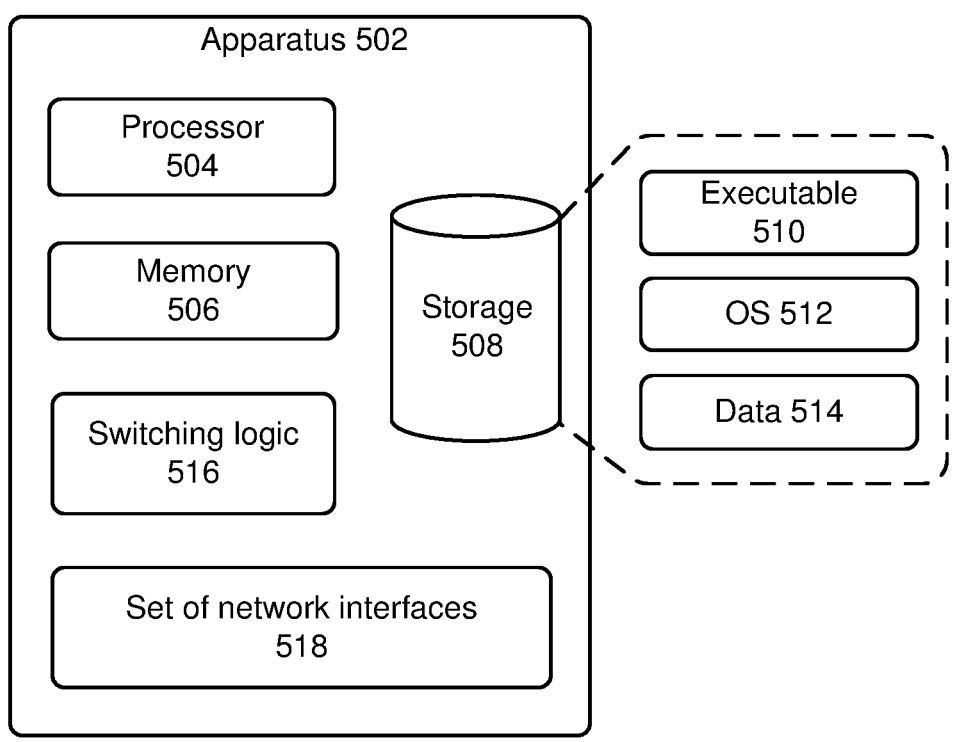
FIG. 5 illustrates an apparatus in accordance with some embodiments described herein.

FIG. 5 illustrates an apparatus in accordance with some embodiments described herein. Apparatus 502 (which can be an IPsec device) comprises processor 504, memory 506 (e.g., a volatile or non-volatile random access memory), and storage 508 (e.g., a flash memory device or a disk drive). Storage 508 can store executable 510, operating system 512, and data 514. Apparatus 502 also includes switching logic 516 and set of network interfaces 518. The components in apparatus 502 can communicate with one another using a communication mechanism, e.g., a bus, a backplane, and/or a switching fabric.

Executable 510 can include instructions that, when executed by processor 504, cause apparatus 502 to perform one or more methods that are implicitly or explicitly described in this disclosure. Data 514 can include any data that is inputted into or outputted by executable 510. Set of network interfaces 518 can be used to transmit data to and/or receive data from other communication devices. Switching logic 516 can forward network traffic received on one or more network interfaces in accordance with switching/forwarding/routing information stored in apparatus 502. Specifically, in some embodiments, switching logic 516 can be configured by processor 504 to perform one or more methods that are implicitly or explicitly described in this disclosure.

Further embodiments can be envisioned by one of ordinary skill in the art. Combinations or sub-combinations of the subject matter disclosed herein can be advantageously made. This disclosure presented an example of a network protocol specifically designed to collect Quality of Path metrics on a per-QoS-class basis. The protocol has the following features: (1) includes path ID and class ID for identifying different paths and QoS classes, (2) provides mechanisms for direct measurement of throughput, latency/delay, jitter and loss, duplication or out-of-sequence arrival of data packets, (3) includes multiple timestamps such that both one-way and round-trip latency can be calculated, (4) timestamping mechanism also allows for a simple calculation to differentiate between network-delay and other processing/queuing delays, (5) designed to be suitable for encapsulation within IP tunnels, (6) designed with minimal additional data overhead in mind, and (7) designed with minimal CPU overhead in mind.

This disclosure presented a mechanism for inserting/retrieving path quality records in TFC padding in ESP-encapsulated IP packets. This approach provides end-to-end security/integrity that is no less than that of the data packets themselves. The use of TFC padding also ensures interoperability with third-party-compliant ESP implementations, as these will ignore the additional padding if they don't understand the path quality records.

The monitoring processes disclosed herein use minimal state, and allow independent operation at both the sending and receiving endpoints. Note that the embodiments disclosed herein are not limited to ESP as the transport mechanism. The principle of carrying additional data in TFC padding applies to any IP tunneling protocol that supports such padding. For example, a GRE or VXLAN tunnel could also pad IP packets with path quality data and work equally as well as an ESP solution. Like ESP, these solutions would also be expected to interoperate correctly with third-party tunnel endpoints that are not "path-quality-aware."

As explained above, the following process describes the operation of an embodiment. A sender adds a Sequence Number Record (SNR) to the padding in each packet. The SNR includes a path identifier (ID) and a class ID, and the sender maintains a unique incrementing counter for each (path ID, class ID) tuple. The sender may include the SNR in every packet, or in a sample of packets, along with a packet count since the last SNR. Putting an SNR in every packet makes detection of packet loss more reliable, but a sampled SNR may often provide an adequate estimate of packet loss with less overhead. Periodically (e.g., every N packets or after a certain time interval, or some combination of both) the sender also adds a Latency Request (LREQ) to the padding. Specifically, the LREQ can be appended after the SNR in the TFC padding field. The LREQ includes a timestamp indicating when the request was generated (or a timestamp indicating when the request was actually sent). This is the sender's transmit (TX) timestamp. Now, all of the sender's IP packet data and the TFC padding (which includes the SNR and optionally the LREQ) are then encapsulated in ESP and transmitted.

The receiver inspects incoming SNRs and uses a sliding window bitmap to track out-of-order or missing packets. The bitmap and stats are maintained for each (path ID, class ID) tuple. The receiver may also keep general throughput stats, e.g., number of packets per unit time, number of bytes per unit time, etc. When the receiver receives an LREQ, it timestamps it immediately. This is the receiver's receive (RX) timestamp. The receiver then puts the LREQ in a pending response queue.

As traffic naturally flows back from the receiver to the sender, the receiver will inspect the pending queue for any outstanding LREQs. If it finds any, it appends a Latency Response Record (LRESP) to the outgoing data. This includes all of the LREQ data, plus another timestamp, which is the receiver's TX timestamp. The receiver will also periodically add Throughput/Loss Records (TPUTL) to the return data. These records include details of the packet loss and throughput data that the receiver has been gathering.

If/when the sender receives LRESP and TPUTL records, it can use that data to calculate throughput, loss, latency and jitter. The four timestamps in each LRESP allow the sender to eliminate the time the data spent queued on the receiver side from its latency calculations. If the clocks are adequately synchronized on both ends, the sender may also calculate one-way latency, in addition to the RTT.

If the receiver is not capable of processing/replying to the path quality data, it will simply ignore the TFC padding. This does not require any action on the sender's part, i.e., the only burden the sender has is to maintain counters on a per (path ID, QoS-class ID) basis. Note that there are no memory issues at the sender, e.g., this protocol will not cause the accumulation of unanswered LREQ records.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for monitoring path quality, the method comprising:
   adding, by a source node, a path quality record to a first Traffic Flow Confidentiality (TFC) padding field of a first Internet Protocol (IP)/Encapsulated Security Payload (ESP) packet;
   sending, by the source node, the first IP/ESP packet to a destination node;
   receiving, by the source node, a second IP/ESP packet from the destination node;
   extracting, by the source node, a response path quality record from a second TFC padding field of the second IP/ESP packet; and
   determining, by the source node, a path quality metric based on the response path quality record.

2. The method of claim 1, wherein the path quality record includes a path identifier that corresponds to a network path, a class identifier that corresponds to a Quality of Service (QoS) class, and a sequence number that is used to distinguish between distinct path quality records.

3. The method of claim 2, wherein the path quality metric is an IP/ESP packet throughput value corresponding to the network path and the QoS class.

4. The method of claim 2, wherein the path quality metric is an IP/ESP packet loss value corresponding to the network path and the QoS class.

5. The method of claim 1, wherein the path quality record includes (1) a latency measurement request, and (2) a first timestamp when the first IP/ESP packet was sent by the source node.

6. The method of claim 5, wherein the response path quality record includes (1) the first timestamp when the first IP/ESP packet was sent by the source node, (2) a second timestamp when the first IP/ESP packet was received by the destination node, (3) a third timestamp when the second IP/ESP packet was sent by the destination node, and (4) a fourth timestamp when the second IP/ESP packet was received by the source node.

7. The method of claim 6, wherein the path quality metric is a round trip delay time value corresponding to a network path and a QoS class.

8. The method of claim 6, wherein system clocks of the source node and the destination node are synchronized, and wherein the path quality metric is a one-way latency value corresponding to a network path and a QoS class.

9. The method of claim 6, wherein the path quality metric is a jitter value corresponding to a network path and a QoS class.

10. The method of claim 1, comprising:
    receiving, by the destination node, the first IP/ESP packet from the source node;
    extracting, by the destination node, the path quality record from the first TFC padding field of the first IP/ESP packet;

using, by the destination node, the path quality record to determine path quality measurement data corresponding to a network path and a QoS class;

creating, by the destination node, the response path quality record, wherein the response path quality record includes the path quality measurement data;

adding, by the destination node, the response path quality record to the second TFC padding field of the second IP/ESP packet; and sending, by the destination node, the second IP/ESP packet to the source node.

11. The method of claim 10, wherein the path quality measurement data includes an IP/ESP packet throughput value corresponding to the network path and the QoS class.

12. The method of claim 10, wherein the path quality measurement data includes an IP/ESP packet loss value corresponding to the network path and the QoS class.

13. The method of claim 10, wherein the path quality measurement data includes (1) a first timestamp corresponding to when the first IP/ESP packet was received at the destination node, and (2) a second timestamp corresponding to when the second IP/ESP packet was sent to the source node.

14. A non-transitory computer-readable storage medium storing instructions that, when executed by a processor in a source node, cause the source node to perform a method for monitoring path quality, the method comprising:

adding a path quality record to a first Traffic Flow Confidentiality (TFC) padding field of a first Internet Protocol (IP)/Encapsulated Security Payload (ESP) packet;

sending the first IP/ESP packet to a destination node;

receiving a second IP/ESP packet from the destination node;

extracting a response path quality record from a second TFC padding field of the second IP/ESP packet; and determining a path quality metric based on the response path quality record.

15. The non-transitory computer-readable storage medium of claim 14, wherein the path quality record includes a path identifier that corresponds to a network path, a class identifier that corresponds to a Quality of Service (QoS) class, and a sequence number that is used to distinguish between distinct path quality records.

16. The non-transitory computer-readable storage medium of claim 14, wherein the path quality record includes (1) a latency measurement request, and (2) a first timestamp when the first IP/ESP packet was sent by the source node.

17. The non-transitory computer-readable storage medium of claim 16, wherein the response path quality record includes (1) the first timestamp when the first IP/ESP packet was sent by the source node, (2) a second timestamp when the first IP/ESP packet was received by the destination node, (3) a third timestamp when the second IP/ESP packet was sent by the destination node, and (4) a fourth timestamp when the second IP/ESP packet was received by the source node.

18. A non-transitory computer-readable storage medium storing instructions that, when executed by a processor in a destination node, cause the destination node to perform a method for monitoring path quality, the method comprising:

receiving a first Internet Protocol (IP)/Encapsulated Security Payload (ESP) packet from a source node;

extracting a path quality record from a first Traffic Flow Confidentiality (TFC) padding field of the first IP/ESP packet;

using the path quality record to determine path quality measurement data corresponding to a network path and a Quality of Service (QoS) class;

creating a response path quality record, wherein the response path quality record includes the path quality measurement data;

adding the response path quality record to a second TFC padding field of a second IP/ESP packet; and sending the second IP/ESP packet to the source node.

19. The non-transitory computer-readable storage medium of claim 18, wherein the path quality record includes a path identifier that corresponds to the network path, a class identifier that corresponds to a the QoS class, and a sequence number that is used to distinguish between distinct path quality records.

20. The non-transitory computer-readable storage medium of claim 18, wherein the path quality record includes (1) a latency measurement request, and (2) a first timestamp when the first IP/ESP packet was sent by the source node, and wherein the response path quality record includes (1) the first timestamp when the first IP/ESP packet was sent by the source node, (2) a second timestamp when the first IP/ESP packet was received by the destination node, (3) a third timestamp when the second IP/ESP packet was sent by the destination node, and (4) a fourth timestamp when the second IP/ESP packet was received by the source node.

21. An apparatus, comprising:

a processor; and a non-transitory storage medium storing instructions that, when executed by the processor, cause the processor to monitor path quality by performing a set of operations, comprising:

adding a path quality record to a first Traffic Flow Confidentiality (TFC) padding field of a first Internet Protocol (IP)/Encapsulated Security Payload (ESP) packet;

sending the first IP/ESP packet to a destination node;

receiving a second IP/ESP packet from the destination node;

extracting a response path quality record from a second TFC padding field of the second IP/ESP packet; and determining a path quality metric based on the response path quality record.

* * * * *